US006466689B1

(12) United States Patent
MacMahon

(10) Patent No.: US 6,466,689 B1
(45) Date of Patent: Oct. 15, 2002

(54) METHOD AND SYSTEM FOR DIGITAL RADIOGRAPHY

(75) Inventor: Heber MacMahon, Chicago, IL (US)

(73) Assignee: Arch Development Corp., Chicago, IL (US)

(*) Notice: Subject to any disclaimer, the term of this patent is extended or adjusted under 35 U.S.C. 154(b) by 0 days.

(21) Appl. No.: 08/173,935

(22) Filed: Dec. 28, 1993

Related U.S. Application Data

(63) Continuation of application No. 07/803,063, filed on Nov. 22, 1991, now abandoned.
(51) Int. Cl.[7] .................................................. G06T 5/00
(52) U.S. Cl. ........................ 382/132; 382/274; 128/922
(58) Field of Search .............................. 382/6, 54, 132, 382/274; 364/413.13, 413.16, 413.17, 413.19; 128/922

(56) References Cited

U.S. PATENT DOCUMENTS

| | | | | |
|---|---|---|---|---|
| 3,700,329 A | * | 10/1972 | Mason | 355/81 |
| 4,315,318 A | * | 2/1982 | Kato et al. | 382/54 |
| 4,356,398 A | * | 10/1982 | Komaki et al. | 364/413.13 |
| 4,394,089 A | * | 7/1983 | McIntosh et al. | 358/75 |
| 4,819,188 A | * | 4/1989 | Matsubara et al. | 378/901 |
| 4,907,288 A | * | 3/1990 | Shimoni | 382/6 |
| 4,918,534 A | * | 4/1990 | Lam et al. | 358/213.13 |
| 5,051,902 A | * | 9/1991 | Hishinuma | 382/54 |
| 5,224,177 A | * | 6/1993 | Doi et al. | 382/54 |

OTHER PUBLICATIONS

"Computer–aided diagnosis in chest radiology," Journal of Thoracic Imaging, vol. 5, Issue 1, 1990, Heber MacMahon, et al., pp. 67–76.

"Digital mobil radiography," Journal of Thoracic Imaging, vol. 5, Issue 1, 1990, Stuart S. Sagel, et al., pp. 36–48.

"Image Optimization in a Computed–Radiography/Photostimulable–Phosphor System," Journal of Digital Imaging, vol. 2, No. 4, Nov., 1989, Rober H. Sherrier, et al., pp. 212–227.

"Initial clinical experience with computed radiography imaging in an emergency department," Applied Radiology, Jan., 1989, Margaret J. Milos, MD, et al., pp. 32–37.

"Photostimulable Phosphor Radiographic Systems," Investigative Radiology, Jun., 1991, vol. 26, No. 6, Murphy, et al., pp. 592–597.

* cited by examiner

*Primary Examiner*—Jon Chang
(74) *Attorney, Agent, or Firm*—Oblon, Spivak, McClelland, Maier & Neustadt, P.C.

(57) ABSTRACT

A system and method for digital imaging. A digital radiological image of a subject is obtained having at least one low density region. The image is processed using first weighting factors in the at least one low density region of the digital image and second weighting factors smaller than the first weighting factors in regions of the digital image other than the at least one low density region. A processed digital image is obtained and a representation of the processed digital image is produced. In the processing of the image, unsharp mask filtering is employed using a processing curve having maximum unsharp mask filtering in the at least one low density region of the digital image and a constant amount of unsharp mask filtering less than the maximum unsharp mask filtering in the regions of the image other than the low density regions.

22 Claims, 7 Drawing Sheets

METHOD AND SYSTEM FOR DIGITAL RADIOGRAPHY

This application is a continuation of application Ser. No. 07/802,063, filed Nov. 22, 1991, now abandoned.

The U.S. Government has a paid-up license in this invention and the right in limited circumstances to require the patent owner to license others under reasonable terms as provided for by the terms of US PHS Grants CA 24806 awarded by the National Institute of Health.

BACKGROUND OF THE INVENTION

1. Field of the Invention

The present invention relates to a system and method for digital radiography, and more particularly to a system and method of digital chest radiography producing a single optimized image.

2. Discussion of the Background

Digital radiography provides the ability to manipulate a radiographic image in order to improve detection of abnormal findings. The adjustable parameters include density, contrast and edge enhancement by digital unsharp masking. The chest radiograph presents a particularly difficult challenge because of the large variation in x-ray transmission between the lungs and the mediastinum, as well as the great variety of abnormalities which may occur. These abnormalities range from relatively large "low frequency" types of findings such as nodules and air space infiltrates, to small "high frequency" findings such as pneumothorax and fine interstitial lung disease. It is therefore difficult to devise a single form of processing which is ideal for all applications.

Storage phosphor computed radiography (CR) is the most widely used digital technique in general radiography. This system was developed by Fuji Photo Film Company, and is extensively discussed in the patent literature. CR imaging systems are configured to produce hard copy consisting of both a mildly processed image, which resembles a conventional radiograph, and a more heavily processed version of the same image. The two images are printed on a single piece of film, typically 10 inches by 14 inches in size.

The image processing parameters of the imaging systems include the characteristic curve, the average contrast gradient contrast, unsharp mask filtering (UMF) and the processing curve. The characteristic curve is a measure of the optical density of the image, that is, how light or dark the image is, as a function of exposure or X-ray intensity, and provides contrast gradient information, while the processing curve represents the relative degree of UMF as a function of pixel value. UMF parameters include the mask size (typically 5.50 mm) and the weighting factor. The weighting factor, which governs the intensity of UMF, varies from 0.5 in the mildly processed standard image to 5.0 in the heavily processed standard image. A more detailed discussion of unsharp mask filtering and its relation to chest radiography are provided by Pratt, "Digital Image Processing", John Wiley & Sons, New York (1978), MacMahon et al, "The Effect of Digital Unsharp Masking on the Detectability of Interstitial Infiltrates and Pneumothoraces", *Proc. SPIE*, vol. 555, pp. 246–252 (1985), Ishida et al, "High quality digital radiographic images: Improved detection of low-contrast objects and preliminary clinical studies", *Radiographics*, vol. 3, pp. 325–328 (1983), Loo et al, and "Investigation of basic imaging properties in digital radiography: 4. Effect of unsharp masking on the detectability of simple patterns", *Med. Phys.* vol. 12, pp. 209–214 (1985).

In the mildly processed image, a characteristic curve as shown in FIG. 1A is typically used to retain good contrast in the lungs. The characteristic curve of FIG. 1A shows that at low pixel values, the optical density is slowly varying. As the pixel value increases, the optical density varies more rapidly. At higher pixel values, the optical density levels off. A typical chest image obtained using the characteristic curve of FIG. 1A is shown in FIG. 2A. This moderately steep contrast gradient provides good contrast in the periphery of the lung in a standard dual image CR chest format, for example, but provides poor mediastinal detail. This approximates to a poor quality conventional screen/film radiograph, such as might be achieved with a moderately high contrast film. This is clearly not acceptable for use as a single image, as information in low density areas is deficient.

The more heavily processed standard image uses a characteristic curve as shown in FIG. 1B. This more heavily processed image provides impressive detail in low density areas of the image such as the mediastinum and soft tissues. Fine details, such as septal lines and pleural fissures are also enhanced. A typical chest image obtained using the characteristic curve of FIG. 1B is shown in FIG. 2B. The enhancement is achieved by using a relatively straight characteristic curve with a low overall contrast gradient, in combination with pronounced UMF. The flat characteristic curve produces a wide latitude effect, with retention of information in both low and high density areas. This would produce an unacceptably "flat" appearance in the absence of UMF. The processing effectively restores local contrast and enhances high frequency detail. However, the conspicuousness of pulmonary infiltrates and other relatively large low contrast abnormalities is markedly diminished in the more heavily processed image. This is due to the low overall contrast, as well as an increase in appearance noise due to UMF. Therefore, this type of image, if used in isolation, is also unacceptable. The ideal single image would retain large area contrast in the periphery of the lungs, while enhancing local contrast in low density areas to increase visibility of mediastinal, retromediastinal and retrodiaphragmatic details.

The prior art system uses a processing curve as shown in FIG. 3. This curve shows the relationship between the intensity of the UMF applied to the image and the local pixel value of the image. FIG. 3 gives the pixel value as a function of weighting factor fraction, which is the degree of the UMF blurred component added to the processed image, with 1.0 indicating that the degree of blurred component added is the same as the original digitized image. The UMF weighting factor is altered according to local image density. In this case, the processing curve is non-linear as different intensities of UMF are applied according to the density of the image. In the very low density areas, such as may occur in the mediastinum and upper abdomen, the UMF weighting factor is 0. The weighting factor rises rapidly to 1.0 (100%) in the higher density areas such as the lungs.

FIGS. 2A and 2B considered together illustrate the standard dual image format where the mildly and heavily processed images are placed on a single film. While it is clear that these dual images are complimentary to some extent, it has not been demonstrated that this dual standard image format is optimal from either a diagnostic or operational point of view. Although the use of dual images is logical in theory, this format requires double the amount of film necessary for a given image size, and provides half the image size for a given area of film when both the mildly and heavily processed images are printed on a single film. Having two images printed on a single film produces images which are undesirably small, and this small size both impedes the effectiveness of the system and the diagnostic accuracy. The small size of the images has been found deficient by radiologists and clinicians.

SUMMARY OF THE INVENTION

It is therefore an object of the present invention to provide a novel system and method of digital radiography which overcomes the disadvantages of the prior art noted above.

It is another object of the present invention to provide a system and method of digital radiography which produces a single image which improves the visibility of detail in low density areas while maintaining good overall contrast.

These and other objects are achieved by a digital imaging system having means for obtaining a digital radiological image of a subject having at least one low density region, image processing means for processing said digital image using weighting factors, said processing means using first weighting factors in said at least one low density region of said digital image, and second weighting factors smaller than said first weighting factors for regions of said digital image other than said at least one low density region, storage means for storing said digital image and said processed digital image, and output means for producing a representation of said processed digital image. The system further includes control means for controlling the operation of the system, the control means including means for allowing an operator to select processing parameters used in said image processing means.

In the image processing means, a characteristic curve with a moderately steep gradient is used which will provide improved visibility of detail in low density regions of the digital image while minimally reducing the conspicuousness of certain infiltrates and nodules. The imaging means further uses a processing curve in conjunction with unsharp mask filtering having maximum unsharp mask filtering in the low density regions of the digital image and a constant amount of unsharp mask filtering less than said maximum unsharp mask processing in regions of the digital image other than the low density regions.

The system according to the invention therefore produces a single image having markedly improved detail in the low density region while maintaining the conspicuousness of other relatively large low contrast abnormalities.

The above objects are also achieved by a method according to the invention including the steps of obtaining a digital radiological image of a subject having at least one low density region, processing said digital image using first weighting factors in the at least one low density region and second weighting factors smaller than the first weighting factors in regions of the digital image other than the at least one low density region, and producing a representation of the processed digital image.

The processing step may include using a characteristic curve having a moderately steep contrast gradient, and a processing curve in conjunction with unsharp mask filtering wherein maximum unsharp mask processing is carried out in the at least one low density region of the digital image and a constant amount of unsharp mask filtering less than said maximum unsharp mask filtering is carried out in regions of the digital image other than the at least one low density region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 4:
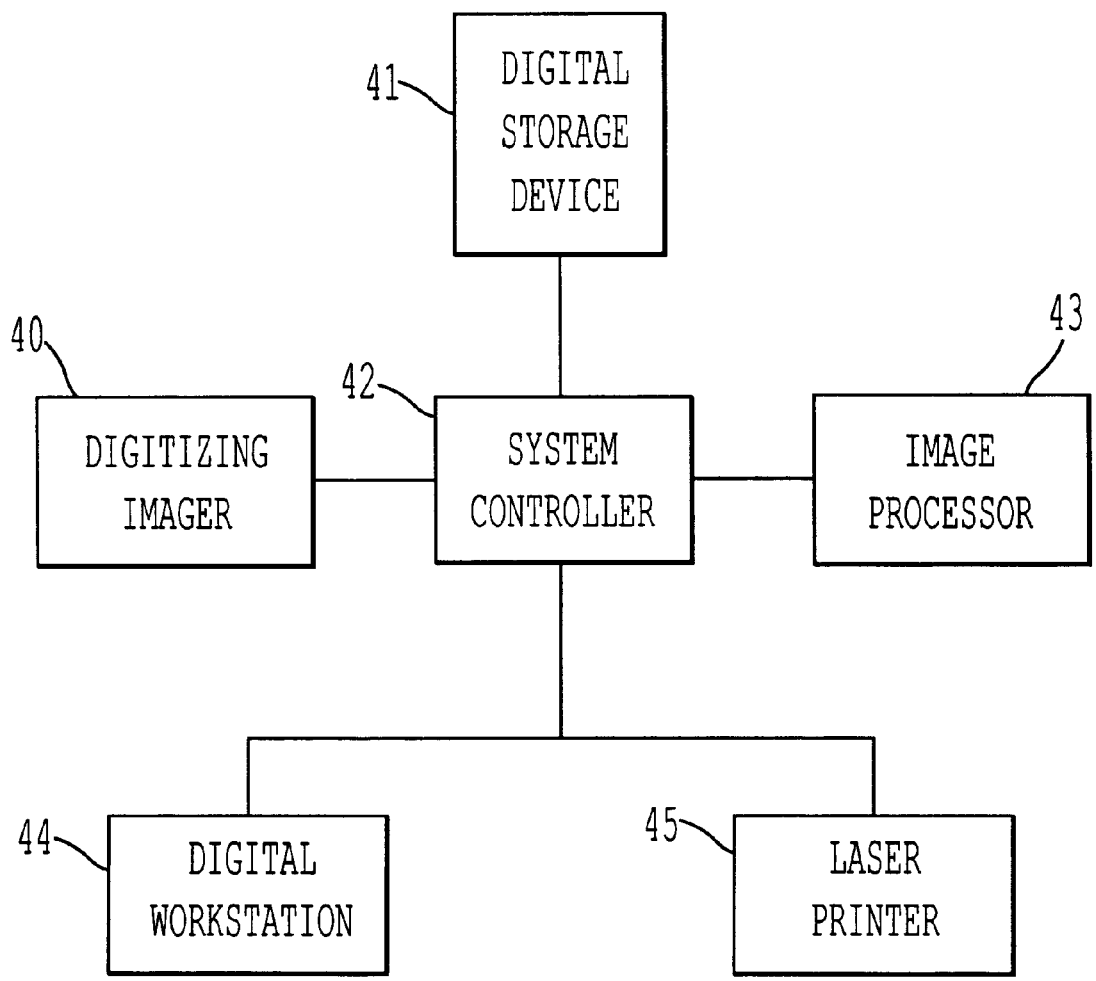
FIG. 4 is a diagram of the system according to the invention.

Referring now to the drawings, wherein like reference numerals designate identical or corresponding parts throughout the several views, and more particularly to FIG. 4 thereof, where the system according to the invention is shown. The system includes a system controller 42 which controls the overall operation of the digital imaging system of FIG. 4. System controller 42 can be implemented using a computer or microprocessor, for example, along with an operator interface for entering operator-variable parameters. A digitizing imager 40 produces a digitized image which is transferred to system controller 42. In a first embodiment of the system according to the invention, digitizing imager 40 is a computed radiography (CR) type digital imager having a storage phosphor plate which is scanned using a finely collimated laser beam. The phosphor plate releases energy, in the form of light, in proportion to the amount of x-ray energy absorbed by the plate. The emitted light is measured and recorded to produce an image, and the image is digitized.

System controller 42 is connected to and controls image processor 43, where image processing on the digital images such as UMF using the operator-selectable operating parameters is carried out. The operating parameters are selected via the operator interface of system controller 42. Image processor 43 can be implemented in hardware, using a microprocessor, for example, or can be implemented in software and controlled by system controller 42.

Also connected to system controller 42 is digital storage device 41 for storing the digitized images from digitizing imager 40. Storage device 41 stores the digital images in preparation for processing by the image processor 43 and digital images acquired when processing is being carried out. System controller 42 can transfer images from both digitizing imager 40 and digital storage device 41 for processing in image processor 43, and can either store the processed image in digital storage device 41 or output the image for viewing by the operator or radiologist.

The output image may be viewed on a digital workstation 44 having a high resolution video display, for example. Alternatively, system controller 42 can transfer the output image to laser printer 45 which produces a hard copy which is typically read by a radiologist as will be apparent to one skilled in the art.

Figure 1A:
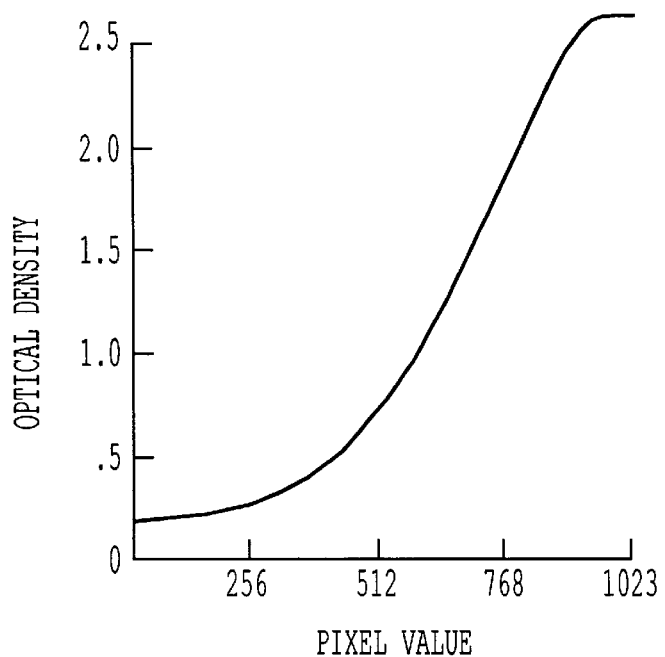
FIGS. 1A and 1B are graphs illustrating the characteristic curve of a standard mildly processed image and the characteristic curve of a standard heavily processed image, respectively.
Figure 5:
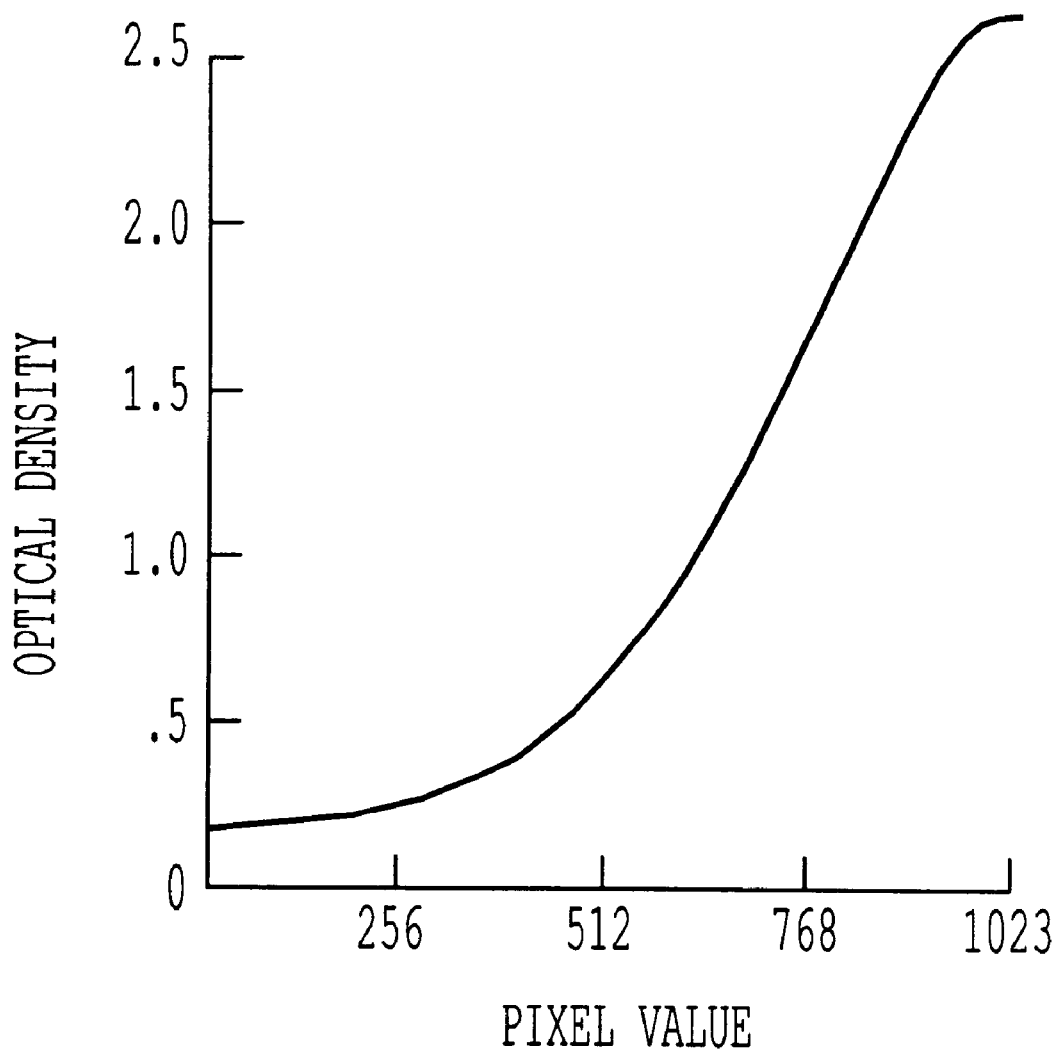
FIG. 5 is a graph of the characteristic curve used in the system according to the invention.

In the image processor 43, in order to retain good contrast in the lungs, a characteristic curve as shown in FIG. 5 was employed. While the curve shown in FIG. 5 is similar to the curve shown in FIG. 1A, to increase detail in the mediastinal and other attenuation areas, the average contrast gradient was reduced to 0.9, as compared to 1.0 for the characteristic curve for the standard mildly processed image shown in FIG. 1A. The slightly reduced overall contrast gradient very subtly reduces overall contrast and thereby minimally reduces the conspicuousness of certain infiltrates and nodules. The characteristic curve according to the invention greatly improves visibility of detail in low density areas of the image such as the mediastinum, the retrocardiac and the retrodiaphragmatic pulmonary areas.

Figure 6:
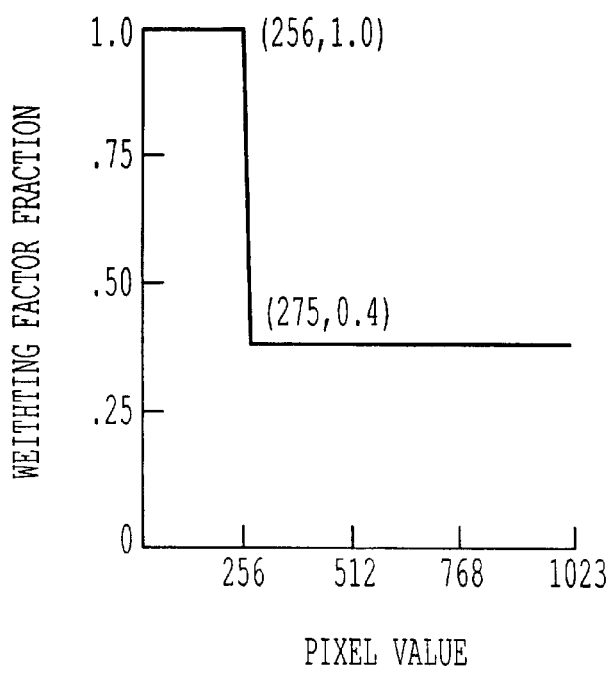
FIG. 6 is a graph of the processing curve used in the system according to the invention.

In FIG. 6 is shown the processing curve according to the invention used in image processor 43. The processing curve according to the invention is radically different from and nearly completely opposite to that used in the prior art system. The processing curve according to the invention provides maximum UMF in low density areas (the low pixel value areas such as the mediastinum), while retaining an intermediate amount of UMF in the higher pixel value areas such as the lungs.

For UMF, a standard (5.50 mm) mask size was employed. An overall weighting factor of 2.5 was applied (compared to 0.5 and 5.0 in the mildly and heavily processed standard images according to the prior art system, respectively), achieving an average weighting factor of 1.0 in the periphery of the lungs. Further, the local weighting factor was actually greater in very unpenetrated areas of the image than in the standard heavily-processed image.

Figure 1B:
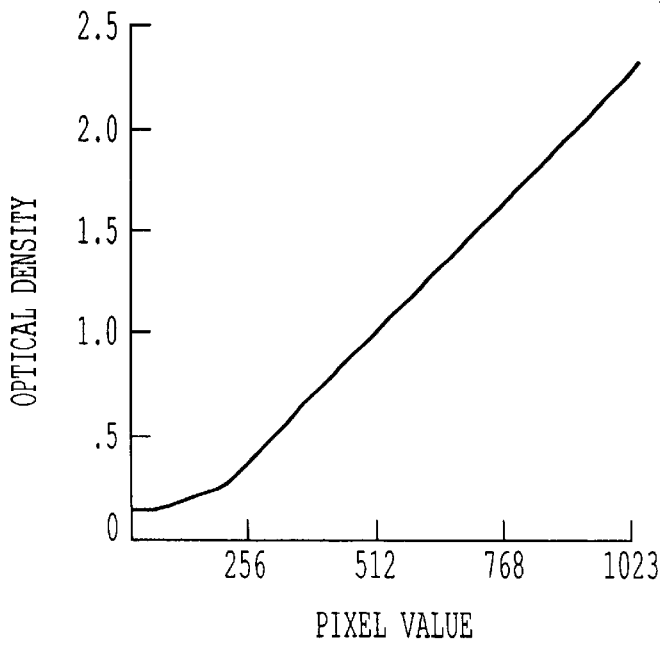
Figure 2B:
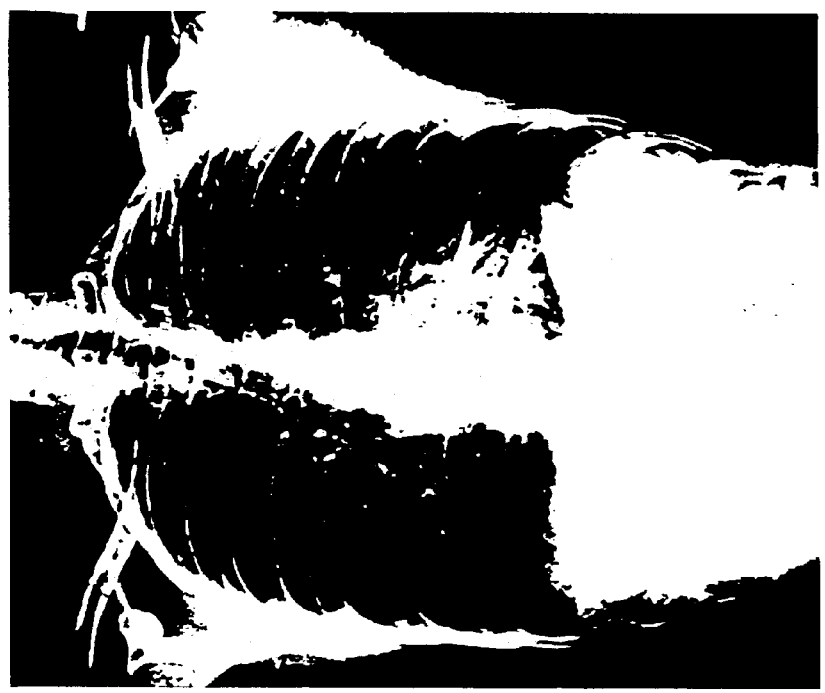
FIGS. 2A and 2B are chest images obtained using the characteristic curves of FIGS. 1A and 1B, respectively.
Figure 2A:
Figure 3:
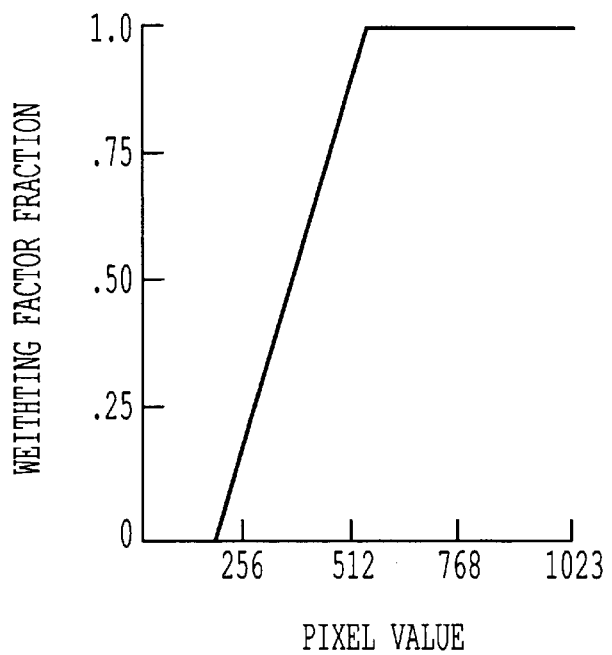
FIG. 3 is a graph of the processing curve used in conjunction with the processed images shown in FIGS. 2A and 2B.
Figure 7:
FIG. 7 is a radiological image obtained using the system according to the invention.

An image obtained using the first embodiment of the system according to the invention is shown in FIG. 7. It is apparent from FIG. 7 that the mediastinal detail is markedly improved compared to the standard mildly processed image shown in FIG. 1A, while the conspicuousness of pulmonary infiltrates and other relatively large low contrast abnormalities is good (compare with FIG. 1B showing the heavily processed image). Here, as a single image is obtained, in comparison with the two images as shown in FIGS. 2A and 2B, a larger image is available which provides improved visual inspection. The use of a single optimized image according to the invention allows the considerably larger image to be printed at no additional cost. Further, as only a single image is processed, the amount of time taken and amount of processing required to produce the single image is reduced by nearly one half. The system according to the invention therefore provides a significant reduction in processing compared to the prior art and an optimal image allowing an easier and improved visual inspection.

As an example of the system according to the present invention, a CR system such as a Toshiba 3030A was used to produce the radiological images. An observer test was employed to evaluate the obtained images, where cases were selected by two experienced radiologists who did not participate in the observer tests from 250 consecutive emergency chest radiographs. The cases which showed relatively subtle but unequivocal examples of pulmonary infiltrates, nodules, pneumothoraces, catheters and endotracheal tubes were included. In order to balance the number of examples and provide more meaningful statistical analysis, additional examples of nodules, pneumothoraces, catheters and endotracheal tubes were selected from subsequent examinations outside the initial sample of 250 cases. The results of subsequent radiographs or computed tomography (CT) scans were consulted as necessary for documentation of findings.

Eight radiologists who had no prior knowledge of the cases, and who had not participated in their selection acted as observers. These individuals had limited prior experience with dual image format CR, and had no prior experience with the single image obtained with the system according to the invention. In all, 50 cases were selected including anteroposterior (AP) portable radiographs and standard posteroanterior PA views. For purposes of evaluation, each hemithorax was considered separately. There were 20 examples of infiltrates including air space and interstitial disease, 10 examples of nodules, 10 examples of pneumothoraces, 16 having venous catheters, and 14 having endotracheal tubes.

Each case was printed in both the standard dual image format according to the prior art, and using the single image system according to the invention. Images were presented to the observers in a systematically varied order in two reading sessions, to minimize possible reading order effects, and to ensure that the two versions of the given case were never viewed during the same reading session. Observers graded the presence or absence of each finding in each hemithorax on a 5-point scale to facilitate ROC analysis. In the case of catheters and endotracheal tubes, the observers were asked to determine where the tip of the device was located between two marks which had been superimposed identically on each corresponding set of images. No time limit was imposed for viewing of the images.

Composite ROC curves for the detection of nodules, infiltrates, pneumothoraces and internal devices showed no significant differences between the traditional dual image obtained with the system according to the prior art and the new single image obtained with the system according to the invention. There was a slight tendency toward an improved pneumothorax detection with the dual image prior art system ($P=0.13$, i.e., a 13% probability that the result is due to a random chance occurrence.), which may reflect the effect of heavy UMF in the lungs with the conventional heavily processed image.

Importantly, the system according to the invention produced images which were consistently interpreted more rapidly than the dual images obtained with the system according to the prior art, with the dual images obtained with the system according to the prior art requiring approximately 20% more time for diagnosis on average. With increasing experience, a strong preference for the images produced using the system according to the invention was developed among experienced radiologists. The results of these observer tests demonstrate that the system according to the present invention produces images of equal or greater diagnostic value than the images obtained using the prior art system, while providing an improvement in diagnosis time.

In a second embodiment of the present invention, digitizing imager 40 is implemented as a film scanning device of an analog screen film system. The film scanning device provides the image to system controller 42, and the system according to the second embodiment of the invention operates in the same manner as the first embodiment described above. A detailed description of the operation will therefore not be repeated for brevity. As is apparent to one of ordinary skill in the art, other image acquisition systems can be used other than the phosphor plate CR and film scanning device of the first and second embodiments, respectively.

As a variation of both the first and second embodiments, instead of producing a single large image, the processed image output by the image processor 43 can be printed as two identical adjacent images on a single piece of film, similar to the dual image format according to the prior art. The variation of the first and second embodiments can be used advantageously in an emergency room situation where the ability to deliver identical images to a radiologist and a clinician simultaneously provides improved patient care, compared to the prior art which provides two differently processed images to a radiologist or clinician alone. The two identical images can be separated by using a film cutter, for example, in order to deliver the identical images to the different observers.

Figure 8:
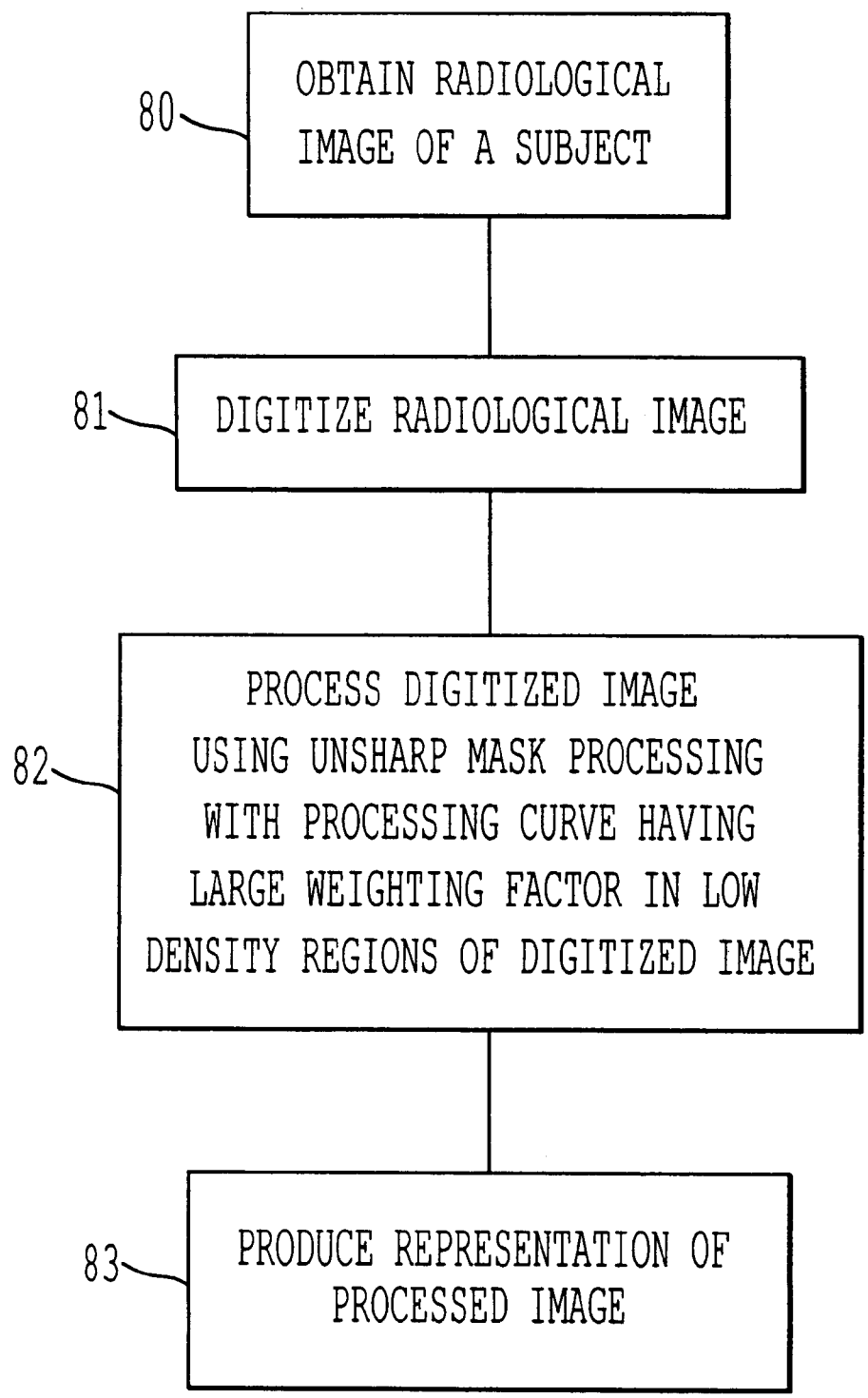
FIG. 8 is flowchart of the method according to the invention.

A first embodiment of the method according to the invention is shown in FIG. 8. In step 80, a radiological image of a subject is obtained. This image may be obtained using either a storage phosphor plate and scanning device, as described in relation to the first embodiment of the system according to the invention, or by a film scanning device as described in relation to the second embodiment according to the system of the invention. The obtained image is then digitized in step 81, and the digitized image is subjected to image processing in step 82. The image processing of step 82 is carried out with a characteristic curve as shown in FIG. 5, and a processing curve as shown in FIG. 6. The processing of step 82 preferably employs UMF using a large weighting factor for low density regions of the image and a smaller constant weighting factor for the remainder of the image such as the lungs. A representation of the digitized image containing the radiological information is produced in step 83, which may be carried out through the use of a digital workstation having a high resolution video display or a laser printer which produces a hard copy, as is done in the first and second embodiments of the system according to the invention.

The output representation is preferably in the form of a single image which is twice as large as the dual images produced by the prior art method. The output representation may also consist of two identical images in the case where patient care demands that two identical images are required for proper and rapid diagnosis.

As pointed out with respect to the system according to the invention, the method according to the invention produces a single output providing both good contrast as well as excellent detail in low density areas such as the mediastinum and soft tissues. The method also produces an image providing good conspicuity of certain infiltrates and nodules (large, low contrast pulmonary abnormalities).

Obviously, numerous modifications and variations of the present invention are possible in light of the above teachings. For example, the exact values given for the average contrast gradient and the UMF weighting factors are to be understood as representing examples only, and are not to be construed to limit the invention to these exact values. Variations in these values may be required to achieve certain desired types of processing in particular images. Also, in the digital film scanner, the processing parameters may require adjustment based upon the type of film used. Lastly, the digital radiography is not limited to chest imaging, but is applicable to other parts of the body, chest imaging being a particularly useful example of the invention. It is therefore to be understood that within the scope of the appended claims, the invention may be practiced otherwise than as specifically described herein.

What is claimed as new and desired to be secured by letters patent of the United States is:

1. A digital imaging system, comprising:
    imaging means for obtaining a digital radiological chest image of a subject having at least one low density region corresponding to a high attenuation anatomic region of said subject;
    image processing means for processing said digital image using a characteristic curve which increases local contrast in said at least one low density region while retaining large area contrast in regions of said digital image other than said at least one low density region and a processing curve having first weighting factors in said at least one low density region of said digital image, and second weighting factors smaller than said first weighting factors for said regions of said digital image other than said at least one low density region, and for producing a processed digital image;
    storage means for storing said digital image and said processed digital image;
    output means for producing a representation of said processed digital image; and
    control means, connected to said imaging means, said storage means, said image processing means and said output means, for controlling said system and transfer and storage of said digital image and said processed digital image.

2. A system as recited in claim 1, wherein said processing means includes unsharp mask filtering means for processing said digital image using a processing curve having maximum unsharp mask filtering in said at least one low density region of said digital image and a constant amount of unsharp mask filtering less than said maximum unsharp mask filtering in regions of said digital image other than said at least one low density region.

3. A system as recited in claim 1, further comprising:
    means for producing two adjacent images, each comprising said processed digital image, as said representation produced by said output means.

4. A system as recited in claim 1, wherein said processing means processes said digital image using a characteristic curve having an average contrast gradient of 0.9.

5. A system as recited in claim 1, wherein said image processing means uses weighting factors selected such that an overall weighting factor of 2.5 is applied to said digital image, and an average weighting factor of 1.0 is achieved in said regions other than said at least one low density region.

6. A system as recited in claim 1, wherein said control means comprises means for entering operator-selectable processing parameters.

7. A system as recited in claim 1, wherein said imaging means comprises a computed radiography phosphor plate digital imager.

8. A system as recited in claim 1, wherein said imaging means comprises a digital film scanner.

9. A system as recited in claim 2, wherein said image processing means uses unsharp mask filtering weighting factors selected such that an overall weighting factor of 2.5 is applied to said digital image, and an average weighting factor of 1.0 is achieved in said regions other than said at least one low density region.

10. A system as recited in claim 9, wherein said control means comprises means for entering operator-selectable processing parameters.

11. A digital imaging method, comprising:
    obtaining a digital radiological chest image of a subject having at least one low density region corresponding to a high attenuation anatomic region of said subject;
    processing said digital image using a characteristic curve which increases local contrast in said at least one low density region while retaining large area contrast in regions of said digital image other than said at least one low density region and a processing curve having first weighting factors in said at least one low density region and second weighting factors smaller than said first weighting factors in said regions other than said at least one low density region to produce a processed digital image; and producing a representation of said processed digital image.

12. A method as recited in claim 11, wherein said processing said digital image step comprises:

processing said digital image using a characteristic curve having an overall contrast gradient of 0.9.

13. A method as recited in claim 11, wherein said processing said digital image step comprises:

processing said digital image using unsharp mask processing with a processing curve having maximum unsharp mask processing in said at least one low density region of said digital image and a constant amount of unsharp mask processing less than said maximum unsharp mask processing in said regions of said digital image other than said at least one low density region.

14. A method as recited in claim 11, wherein said processing said digital image step comprises:

processing said digital image using unsharp mask filtering with weighting factors having an overall weighting factor of 2.5 and an average weighting factor in said regions of said digital image other than said at least one low density region of 1.0.

15. A method as recited in claim 11, wherein said step of producing said representation of said processed digital image comprises displaying said processed digital image on a high resolution video display.

16. A method as recited in claim 11, wherein said step of producing said representation of said processed digital image comprises printing said processed digital image on a film using a laser printer.

17. A method as recited in claim 13, wherein said processing said digital image step further comprises:

processing said digital image using unsharp mask filtering with weighting factors having an overall weighting factor of 2.5 and an average weighting factor in said regions of said digital image other than said at least one low density region of 1.0.

18. A method as recited in claim 17, wherein said processing said digital image step further comprises:

processing said digital image using a characteristic curve having an overall contrast gradient of 0.9.

19. A system as recited in claim 1, wherein:

said at least one low density region corresponds to the mediastinum; and said regions other than said low density region corresponds to the lungs.

20. A method as recited in claim 11, wherein:

said at least one low density region corresponds to the mediastinum; and said regions other than said low density region corresponds to the lungs.

21. The system as recited in claim 1, wherein:

said processing means processes a single digital image; and said output means produces a representation of a single processed image.

22. The method as recited in claim 11, wherein:

said step of processing comprises processing a single digital image; and said step of producing comprises producing a representation of a single processed image.

* * * * *